US008509257B2

(12) United States Patent
Yakashiro

(10) Patent No.: US 8,509,257 B2
(45) Date of Patent: Aug. 13, 2013

(54) CAN NODE, AND COMMUNICATION METHOD OF COMMUNICATION SYSTEM INCLUDING CAN NODE

(75) Inventor: Masataka Yakashiro, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 752 days.

(21) Appl. No.: 12/654,024

(22) Filed: Dec. 8, 2009

(65) Prior Publication Data

US 2010/0150176 A1    Jun. 17, 2010

(30) Foreign Application Priority Data

Dec. 16, 2008  (JP) ................................ 2008-319986

(51) Int. Cl.
*H04L 12/28* (2006.01)
*H04L 12/56* (2006.01)

(52) U.S. Cl.
USPC ........................................ 370/421; 370/412

(58) Field of Classification Search
USPC ............... 370/389, 390, 229, 235, 241, 252, 370/412, 419, 420, 421; 714/748, 749
See application file for complete search history.

(56) References Cited

U.S. PATENT DOCUMENTS

| 5,784,547 | A * | 7/1998 | Dittmar et al. | 714/4.5 |
| 6,985,975 | B1 * | 1/2006 | Chamdani et al. | 710/55 |
| 2006/0256803 | A1 * | 11/2006 | Nakata et al. | 370/412 |
| 2009/0044067 | A1 * | 2/2009 | Obuchi et al. | 714/748 |
| 2010/0046520 | A1 * | 2/2010 | Nakata | 370/394 |
| 2010/0260102 | A1 * | 10/2010 | Liu et al. | 370/328 |

OTHER PUBLICATIONS

ISO Technical Committee, "Road vehicles—Interchange of digital information—Part 1: Controller area network data link layer and medium access control," 1999, ISOTC 22/SC 3N 11898, ISO/WD 11898-1, pp. 1-48.

* cited by examiner

*Primary Examiner* — Michael Thier
*Assistant Examiner* — Feben M Haile
(74) *Attorney, Agent, or Firm* — McGinn IP Law Group, PLLC

(57) ABSTRACT

A Controller Area Network (CAN) node includes a conversion and retransmission unit which retransmits a transmit message if the transmit message carries a retransmission ID out of ID codes, by changing the ID code of the transmit message to a retransmission-specific ID corresponding to the retransmission ID, where the ID codes indicate priorities of transmit messages, the retransmission ID indicates that the transmit message is to be retransmitted, and the retransmission-specific ID is an ID code specifically for use in retransmission, and a conversion and reception unit which checks whether an original message corresponding to a retransmit message has been received successfully, the retransmit message being a receive message carrying the retransmission-specific ID, and discards the retransmit message if the original message corresponding to the retransmit message has been received successfully, but converts the ID code of the retransmit message into a retransmission ID corresponding to the retransmission-specific ID if the original message corresponding to the retransmit message has not been received successfully.

10 Claims, 12 Drawing Sheets

FIG. 5

| TRANSMIT ERROR DETECTION SIGNAL | TRANSMISSION ID | S1 | S5 | S6 | RETRANSMISSION REQUEST | S2 | S3 | S4 | |
|---|---|---|---|---|---|---|---|---|---|
| H | IDA (RETRANSMISSION ID) | H | H/L | H/L | H | L | L | H | SMSG2 |
| H | OTHER THAN IDA | L | H/L | H/L | H | L | L | H | SMSG1 |
| L | IDA | H | H | L | L | * | * | H | SMSG1 |
| L | IDA | H | L | H | L | * | * | * | * |
| L | IDA | H | L | L | H | H | H | L | IDB (RETRANSMISSION-SPECIFIC ID) + DIC/DATA OF SMSG1 |
| L | OTHER THAN IDA | L | H/L | H/L | L | * | * | * | * |

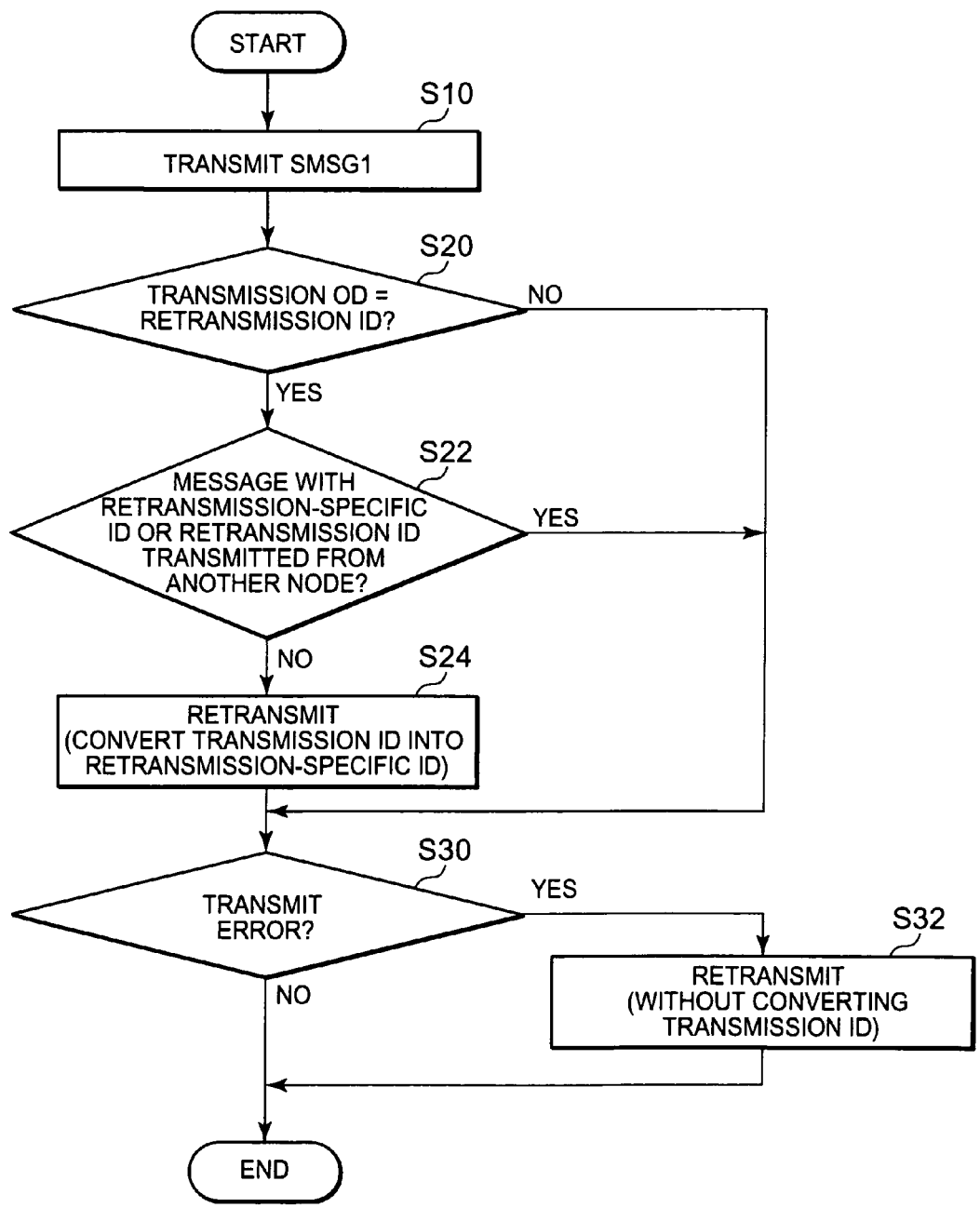

FIG. 7

| ERROR STATE | RECEPTION ID | S5 | S6 | S7 | S8 | S9 | S10 | |
|---|---|---|---|---|---|---|---|---|
| ERROR ACTIVE | IDB (RETRANSMISSION-SPECIFIC ID) | H | L | H | L | H | H | RMSG2 |
| ERROR ACTIVE | IDB (RETRANSMISSION-SPECIFIC ID) | H | L | L | L | H | H | RMSG1 |
| ERROR ACTIVE | IDB (RETRANSMISSION-SPECIFIC ID) | L | H | H/L | L | H | H | RMSG1 |
| ERROR ACTIVE | OTHER THAN IDA AND IDB | L | L | H/L | L | H | H | RMSG1 |
| ERROR PASSIVE | IDB (RETRANSMISSION-SPECIFIC ID) | H | L | H | * | L | * | * |
| ERROR PASSIVE | IDB (RETRANSMISSION-SPECIFIC ID) | H | L | L | H | H | L | ODA (RETRANSMISSION ID)+DLC/DATA OF RMSG1 |
| ERROR PASSIVE | IDB (RETRANSMISSION-SPECIFIC ID) | L | L | H/L | L | H | H | RMSG1 |
| ERROR PASSIVE | OTHER THAN IDA AND IDB | L | L | H/L | L | H | H | RMSG1 |

FIG. 11

| ERROR STATE | TRANSMIT ERROR COUNTER VALUE (TEC) | | RECEIVE ERROR COUNTER VALUE (REC) |
|---|---|---|---|
| ERROR ACTIVE | 0~127 | AND | 0~127 |
| ERROR PASSIVE | 128~255 | OR | 128~255 |
| BUS OFF | 256~ | | — |

CAN NODE, AND COMMUNICATION METHOD OF COMMUNICATION SYSTEM INCLUDING CAN NODE

INCORPORATION BY REFERENCE

This application is based upon and claims the benefit of priority from Japanese Patent Application No. 2008-319986 which was filed on Dec. 16, 2008, the disclosure of which is incorporated herein in its entirety by reference.

BACKGROUND OF THE INVENTION

1. Field of the Invention

The present invention relates to a communications technique for a Controller Area Network (CAN) system.

2. Description of Related Art

Recent vehicles are equipped with a wide variety of electronic control systems which are used to control an engine's ignition timing, used for a gear box, used for an Anti-Block System (ABS), and so on. With increases in the number of vehicle-mounted systems, there arise problems such as increases in the number of wires and the need for sensor redundancy. Besides, if higher performance is pursued, it becomes necessary to control the systems integrally or in a cooperative manner.

To control systems integrally or in a cooperative manner, it is necessary to conduct data communications among the systems. CAN specified by ISO 11898-1 ("Road vehicles— Interchange of digital information Part 1: Controller area network data link layer and medium access control") is a communications protocol developed for this purpose. The protocol is used in a wide range of fields including not only vehicles, but also shipping and medical equipment. Now, the CAN protocol will be described briefly.

FIG. 9 is a schematic diagram showing an example of connections in a CAN system. As shown in FIG. 9, the CAN system 10 includes multiple CAN nodes (hereinafter simply referred to as nodes) 12 interconnected via a CAN bus 14. The CAN bus 14 is made up of two wires (wire 16 and wire 18), and a CAN controller (not shown) in each node determines a level of the CAN bus 14 based on a potential difference between the two wires of the CAN bus 14. A transmitting node 12 can transmit a message to another node 12 by changing this level.

When the CAN bus 14 is not busy, all the nodes 12 connected to the CAN bus 14, excluding nodes in Bus Off state (described later), can initiates transmission of a message, but the first node that initiates transmission to the CAN bus 14 gains the right to transmit. If multiple nodes initiate transmission simultaneously, a node which transmits a message with the highest priority gains the right to transmit. Now, priorities will be described together with a frame structure defined by the CAN protocol.

The CAN protocol defines five types of frame: data frame, remote frame, error frame, overload frame, and interframe space. The data frame is used by the transmitting node (sender node) to transmit a message to a receiving node (receiver node). The remote frame is used to request a message with the same priority from the sender node. The error frame is used to notify the other node of any detected error. The overload frame is used by the receiver node to notify of a not-ready-to-receive state. The interframe space is used to separate the data frame and remote frame from the previous frame. Now, format of the data frame will be described as an example.

FIG. 10 shows standard format of the data frame defined by the CAN protocol. As shown in FIG. 10, the CAN's data frame includes multiple fields. SOF and EOF are fields which indicate start and end of the frame, respectively. Arbitration Field represents the priority of the frame and stores an ID code which indicates the priority. If multiple nodes initiate transmission simultaneously, arbitration is conducted based on the IDs of transmitted data frames. As a result of the arbitration, the node which transmits the data frame whose ID has the highest priority proceeds with the transmission, and the other nodes immediately stop transmission and go into a receive operation. Control Field (DLC) represents the numbers of reserved bits and data bytes, and Data Field contains content of the message. CRC Field is used to check for a frame transmit error and ACK Field is used to acknowledge a successful transmission.

Each node 12 is equipped with a transmit error counter and a receive error counter used to count transmit errors and receive errors, respectively. For information about count-up timing and countdown timing of the transmit error counter and the receive error counter as well as about their numbers of counts, it is advised to refer to standards of the CAN protocol. Generally, however, the transmit error counter is incremented when a transmit error is detected, and is decremented when transmission is successful. Similarly, the receive error counter is incremented when a receive error is detected, and is decremented when reception is successful.

Each node changes its state among three error states— Error Active state, Error Passive state, and Bus Off state— according to the counter value (REC) of the receive error counter and counter value (TEC) of the transmit error counter. In Error Active state, the node is ready to participate successfully in communications on the bus. In Error Passive state, the node is more error-prone than in Error Active state. For nodes in Error Passive state, restrictions are placed on continuous transmission and error notification, unlike nodes in Error Active state. The Bus Off state is more error-prone than the Error Passive state. Thus, nodes in Bus Off state are prohibited from performing all transmit and receive operations and are not allowed to participate in communications on the bus.

The changes among the three error states are made based on the counter values of the transmit error counter and receive error counter. As shown in FIG. 11, when the counter value (TEC) of the transmit error counter and counter value (REC) of the receive error counter are both 0 to 127, the node is in Error Active state. When one of TEC and REC is 128 to 255, the node is in Error Passive state. On the other hand, regardless of REC, when TEC is 256 or above, the node is put into Bus Off state and consequently cut off from communications on the CAN bus.

In this way, CAN defines error states according to error proneness, places restrictions on the transmit/receive operations of the node according to the error state, and thereby prevents communications from being obstructed by error-prone nodes.

The CAN protocol provides an automatic message retransmission function to ensure that messages will reach their destination nodes and to reduce undelivered messages. Automatic message retransmission is triggered by a loss in priority arbitration or detection of a transmit error during transmission. Incidentally, detection of transmit errors includes detection made possible by an error notification issued when the destination node fails to receive the message successfully.

SUMMARY

However, the present inventor has recognized the following point. Namely, in the CAN system, when a receive error is detected, a node in Error Active state outputs an active error flag and thereby gives an error notification. Consequently, the sender node recognizes the transmit error and retransmits the message.

On the other hand, the Error Passive state is prone to errors. The node in the Error Passive state is allowed to participate in communications on the bus, but is not allowed to give an error notification actively during reception, in order not to obstruct communications of other nodes. Specifically, even if a node in Error Passive state detects an error, unless another node in Error Active state detects the error, it is determined that there is no error on the bus as a whole. Upon detecting an error, the node in Error Passive state outputs a passive error flag.

For example, as shown in FIG. 12, node A and node B are in Error Active state, but node C has fallen into Error Passive state, causing frequent local errors due to a local failure. In this situation, suppose node A transmits a message to node C.

Node C cannot receive the message successfully, and outputs an error flag to the bus. The error flag is a Passive Error flag. The Passive Error flag is at a recessive level, and is not sensed by other nodes. Thus, node A does not know that node C has failed to receive the message successfully, and consequently does not retransmit the message.

In this case, a check as to whether the receiving node has received the message successfully is made by software in an upper layer. The checking process includes a query to the receiving node, a receipt notification, and the like. Thus, when retransmission is necessary there is a long latency until the retransmission is actually carried out. Besides, recently, processing performed in vehicles has become more complex and traffic on in-vehicle LANs has been growing steadily. Consequently, there is demand to avoid traffic increases caused by processing of queries intended to check whether reception has been successful, receipt notifications, and the like and reduce loads on bus bands.

The present invention seeks to solve one or more of the above problems, or to improve upon those problems at least in part.

In one exemplary embodiment, there is provided a CAN node. The CAN node includes a conversion/retransmission unit and a conversion/reception unit.

The conversion/retransmission unit retransmits a transmit message if the transmit message carries a retransmission ID out of ID codes, by changing the ID code of the transmit message from retransmission ID to a retransmission-specific ID corresponding to the retransmission ID, where the ID codes indicate priorities of transmit messages, the retransmission ID indicates that the transmit message is to be retransmitted, and the retransmission-specific ID is an ID code specifically for use in retransmission.

The conversion/reception unit checks whether an original message corresponding to a retransmit message has been received successfully, the retransmit message being a receive message carrying the retransmission-specific ID, and discards the retransmit message if the original message corresponding to the retransmit message has been received successfully, but converts the ID code of the retransmit message from the retransmission-specific ID into a retransmission ID corresponding to the retransmission-specific ID if the original message corresponding to the retransmit message has not been received successfully.

It should be noted that a method for the CAN node according to the above aspect or a program which makes a computer operate as the CAN node or part of the CAN node according to the above aspect also constitute aspects of the present invention. It should also be noted that a system including a plurality of CAN nodes according to the above aspect also constitutes an aspect of the present invention.

The technique according to the present invention can avoid excessive traffic increases in a CAN system while reducing undelivered messages.

BRIEF DESCRIPTION OF THE DRAWINGS

The above and other purposes, advantages and features of the present invention will become more apparent from the following description of a certain exemplary embodiment taken in conjunction with the accompanying drawings in which:

FIG. 5 is a diagram showing correspondence among signals in a conversion/retransmission unit of the message retransmission management unit shown in FIG. 4;

FIG. 6 is a flowchart showing a flow of processes performed by the conversion/retransmission unit of the message retransmission management unit shown in FIG. 4;

FIG. 7 is a diagram showing correspondence among signals in a conversion/reception unit 220 of the message retransmission management unit shown in FIG. 4;

FIG. 11 is a diagram showing changes in error state of a node in the CAN system and a relationship between receive error counter values and transmit error counter values.

DETAILED DESCRIPTION OF THE EXEMPLARY EMBODIMENTS

Figure 1:
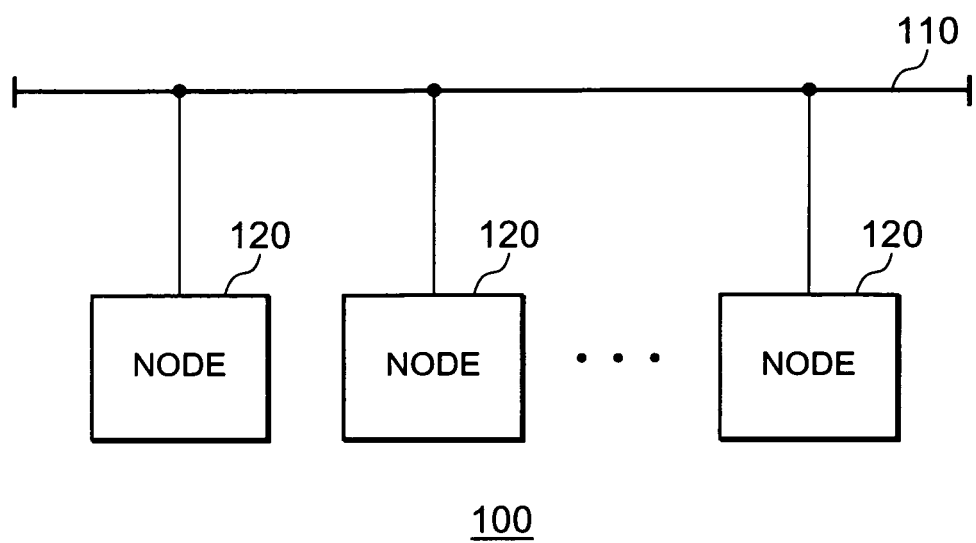
FIG. 1 is a diagram showing a CAN system according to a first exemplary embodiment of the present invention.

The invention will now be described herein with reference to illustrative an exemplary embodiment. Those skilled in the art will recognize that many alternative embodiments can be accomplished using the knowledge of the present invention, and that the invention is not limited to the exemplary embodiment illustrated for explanatory purposes.

First Exemplary Embodiment

A first exemplary embodiment of the present invention will be described below with reference to the accompanying drawings. Incidentally, various components described below and shown in the drawings as being functional blocks which perform various processes can be implemented in terms of hardware by a processor, a memory, or other circuits or implemented in terms of software by a program or the like recorded or loaded in memory. Thus, as will be understood by those skilled in the art, the functional blocks can be implemented by hardware alone, software alone, or combination thereof, and are not restricted to any one of them. Also, for ease of understanding, only those components which are needed in order to describe the technique according to the present invention are illustrated in the drawings. Besides, in the description, the terms "message" and "frame" are used interchangeably.

FIG. 1 shows a CAN system 100 according to the first exemplary embodiment of the present invention. The CAN system 100, which is compliant with the CAN protocol, includes multiple CAN nodes (hereinafter simply referred to as nodes) 120 interconnected via a CAN bus 110.

Figure 2:
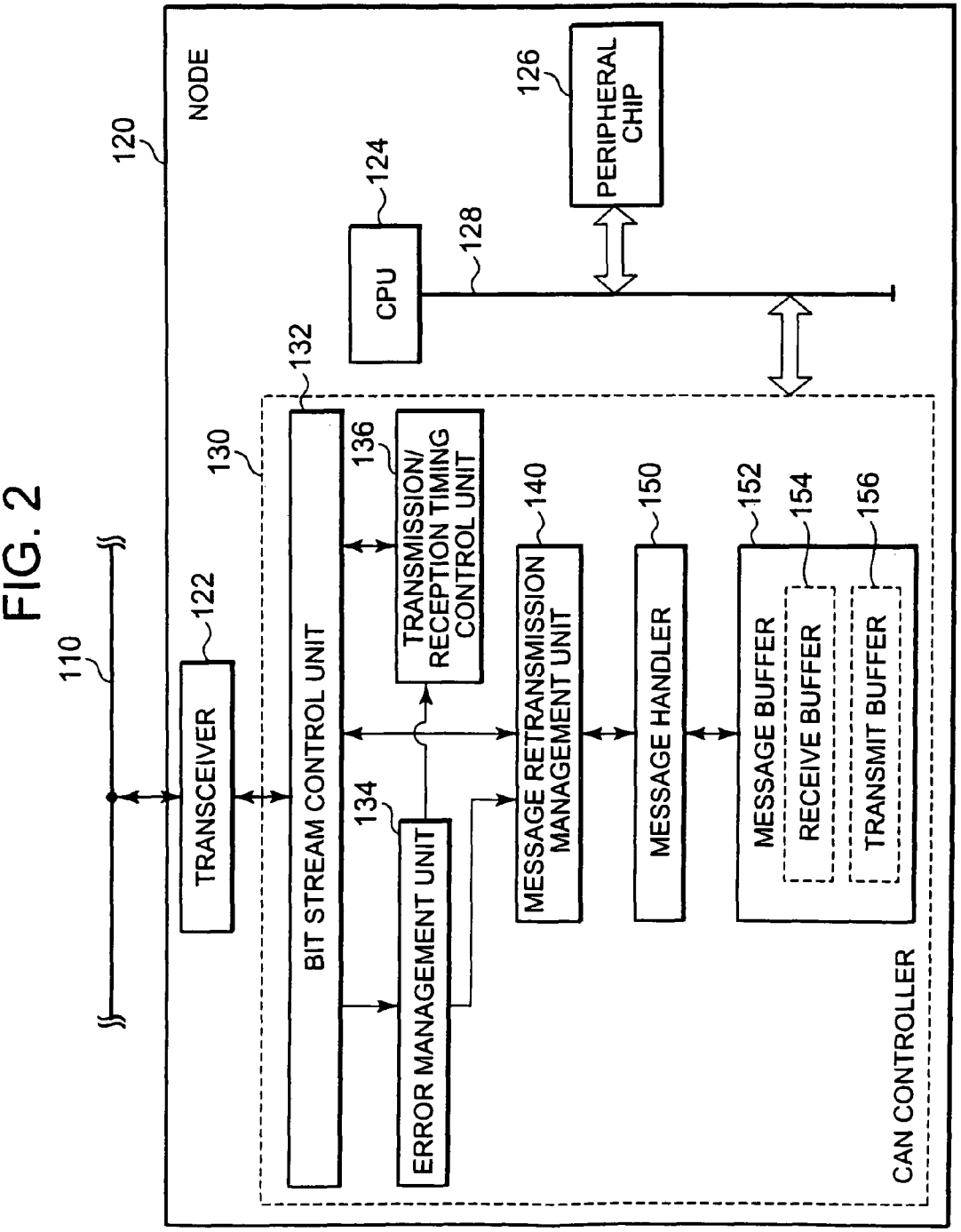
FIG. 2 is a diagram showing a node in the CAN system shown in FIG. 1.

FIG. 2 shows the node 120 in the CAN system 100 shown in FIG. 1. The node 120 includes a transceiver 122, CPU 124, peripheral chip 126, and CAN controller 130. The CPU 124, peripheral chip 126, and CAN controller 130 are interconnected via a local bus 128.

The transceiver 122 connects to the CAN bus 110 and thereby receives frames on the CAN bus 110 and transfers the frames to the CAN controller 130 as well as outputs frames sent out from the CAN controller 130 to the CAN bus 110. Every transmission and reception between the nodes 120 and CAN bus 110 are conducted via the transceiver 122.

The CAN controller 130 includes a bit stream control unit 132, error management unit 134, transmission/reception timing control unit 136, message retransmission management unit 140, message handler 150, and message buffer 152. The message buffer 152 further includes a receive buffer 154 and transmit buffer 156.

The bit stream control unit 132 has a function to check for an error in communications (transmission/reception). If a communications error occurs, the bit stream control unit 132 outputs a signal to the error management unit 134, indicating the communications error. If a transmit error occurs, the bit stream control unit 132 also outputs a transmit error detection signal to the message retransmission management unit 140, indicating the transmit error.

When communications are completed successfully, the bit stream control unit 132 also notifies the error management unit 134 to that effect. Also, when reception or transmission is completed, the bit stream control unit 132 outputs an EOF signal which indicates the completion of reception or transmission to the transmission/reception timing control unit 136.

Furthermore, the bit stream control unit 132 outputs a received frame (receive frame) to the message retransmission management unit 140 and sends out a frame (output frame) from the message retransmission management unit 140 to the CAN bus 110 via the transceiver 122. The timing with which the bit stream control unit 132 outputs the frame to the CAN bus 110 is controlled by the transmission/reception timing control unit 136.

The message retransmission management unit 140 takes one of three actions on the frame received from the bit stream control unit 132: outputs the frame as it is to the message handler 150, outputs the frame to the message handler 150 after converting the ID code, or discards the frame. Also, the message retransmission management unit 140 takes one of two actions on the frame from the message handler 150: outputs the frame as it is to the bit stream control unit 132, or outputs the frame as it is to the bit stream control unit 132 and outputs the frame again after converting the ID code. The message retransmission management unit 140 is a characteristic part of the present invention, and will be described in detail later.

The message handler 150, which is connected between the message retransmission management unit 140 and message buffer 152, makes the receive buffer 154 of the message buffer 152 store receive frames from the message handler 150 and outputs yet-to-be-transmitted transmit frames stored in the transmit buffer 156 to the message retransmission management unit 140.

Figure 3:
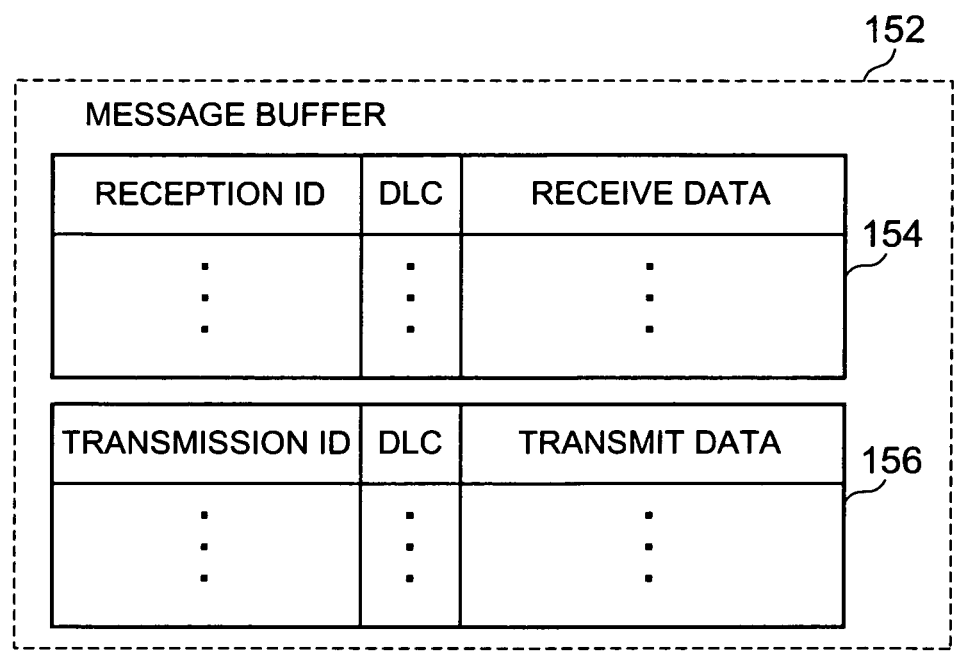
FIG. 3 is a diagram showing a message buffer of the node shown in FIG. 2.

FIG. 3 shows the message buffer 152. The message buffer 152 includes the receive buffer 154 and transmit buffer 156. The receive buffer 154 stores the receive frames from the message handler 150 while the transmit buffer 156 stores the transmit frames yet to be transmitted. As shown in FIG. 3, each of both receive frames and transmit frames is stored with its ID code, DLC (control field data), and data field content associated with each other, where the ID code is referred to as a reception ID in the case of a receive frame and as a transmission ID in the case of a transmit frame and the data field content is referred to as receive data in the case of a receive frame and as transmit data in the case of a transmit frame.

Incidentally, the receive frames stored in the receive buffer 154 are subsequently supplied to the CPU 124 and peripheral chip 126 via the local bus 128. Also, the yet-to-be-transmitted transmit frames stored in the transmit buffer 156 have been received from the CPU 124 or peripheral chip 126 via the local bus 128.

Returning to FIG. 2, the error management unit 134 is equipped with a receive error counter and transmit error counter (neither is shown) and controls the incrementing/decrementing of the receive error counter and transmit error counter based on a signal received from the bit stream control unit 132. Specifically, the error management unit 134 increments the receive error counter when a receive error notification signal is received from the bit stream control unit 132, and increments the transmit error counter when a transmit error notification is received. Also, the error management unit 134 decrements the receive error counter upon reception of a signal indicating that reception has completed successfully from the bit stream control unit 132, and decrements the transmit error counter upon reception of a signal indicating that transmission has completed successfully.

Furthermore, the error management unit 134 manages the error state of the node 120 based on the counter value REC of the receive error counter and counter value TEC of the transmit error counter. Specifically, the error management unit 134 changes the error state of the node 120 among an Error Active state, Error Passive state, and Bus Off state based on REC and TEC as shown in FIG. 11.

The error management unit 134 sends a signal (error state notification signal) which indicates the current error state of the node 120 to the transmission/reception timing control unit 136 and message retransmission management unit 140.

The transmission/reception timing control unit 136 controls the timing of transmission from the node 120, and more specifically, from the CAN controller 130, to the CAN bus 110 based on the EOF signal from the bit stream control unit 132 and the error state notification signal from the error management unit 134.

The transmission/reception timing control unit 136 receives as inputs the error state notification signal, an EOF signal which indicates that transmission has completed successfully (hereinafter referred to as transmission EOF), and an EOF signal transmitted from another node indicating an end of reception of a frame (hereinafter referred to as reception EOF), and outputs a transmit signal to the bit stream control unit 132 according to the error state indicated by the error state notification signal and with transmission timing specified by the CAN protocol.

Specifically, the transmission/reception timing control unit 136 starts counting time when transmission EOF or reception EOF is received in Error Active state, and outputs a transmit signal to the bit stream control unit 132 when an interval (3 bits) specified by the CAN protocol is reached. That is, in both continuous transmission and discontinuous transmission, a minimum transmission interval of the node 120 is 3 bits.

On the other hand, in Error Passive state, the transmission/reception timing control unit 136 outputs transmit signals to the bit stream control unit 132 with different transmission timings in continuous transmission and discontinuous transmission. Specifically, the transmission/reception timing control unit 136 starts counting time upon reception of transmission EOF or reception EOF, and outputs a transmit signal in discontinuous transmission when an interval of 3 bits is reached, but outputs a transmit signal in continuous transmission when an interval of 11 bits is reached. This complies with restrictions placed by the CAN protocol on the continuous transmission conducted by the nodes in the Error Passive state.

The message retransmission management unit 140 has a function to retransmit a message marked for retransmission immediately after transmission of the message in addition to a retransmission function of a normal CAN node to retransmit a message in relation to which a transmit error has been detected. Also, when retransmitting a message marked for retransmission, the message retransmission management unit 140 converts the ID code of the message into a retransmission-specific ID. The retransmission-specific ID corresponds one-to-one with a retransmission ID which indicates a message marked for retransmission, and is not used for regular transmission (including retransmission upon detection of a transmit error).

Also, in addition to a reception function of the normal CAN node, the message retransmission management unit 140 has a function to check whether an original message has been received successfully if a message received from another node carries a retransmission-specific ID and take different actions according to the result of the checking. Now, the message retransmission management unit 140 will be described in detail with reference to FIG. 4.

Figure 4:
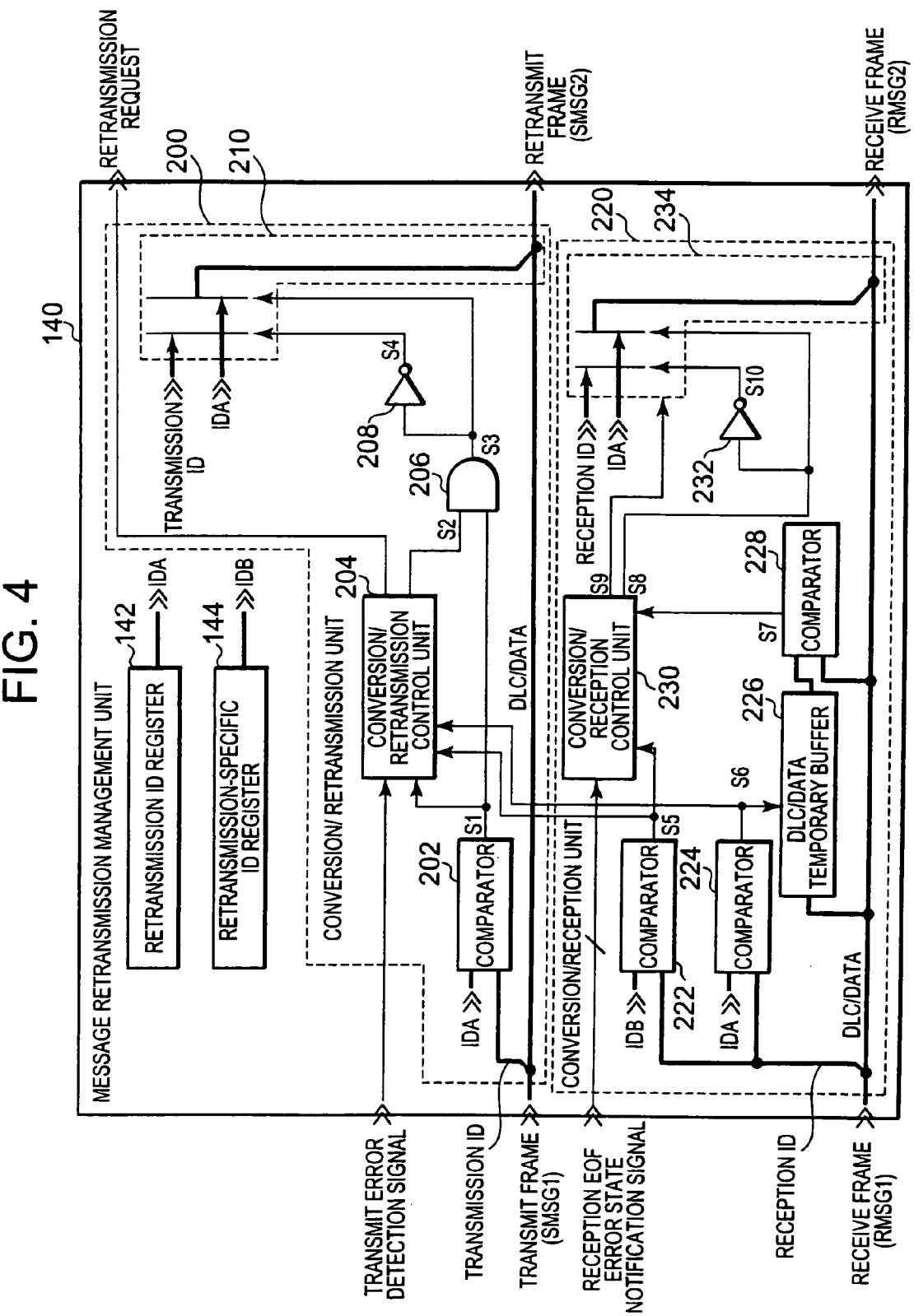
FIG. 4 is a diagram showing a message retransmission management unit of the node shown in FIG. 2.

As shown in FIG. 4, the message retransmission management unit 140 includes a retransmission ID register 142, retransmission-specific ID register 144, conversion/retransmission unit 200, and conversion/reception unit 220.

The retransmission ID register 142 is used to set retransmission ID which is an ID code of a message to be retransmitted. Suppose, for example, IDA is set as a retransmission ID. The messages whose ID codes are IDA are messages to be retransmitted.

The retransmission-specific ID register 144 is used to set a retransmission-specific ID corresponding to the retransmission ID set in the retransmission ID register 142. It is assumed here that IDB is set, where IDB corresponds to IDA set in the retransmission ID register 142. Also, according to the first exemplary embodiment, there is a rule that the retransmission-specific ID is lower in priority than the corresponding retransmission ID and thus the priority indicated by IDB is lower than that of IDA.

Although one retransmission ID and one retransmission-specific ID are set here as an example, multiple pairs of a retransmission ID and retransmission-specific ID may be set alternatively.

The conversion/retransmission unit 200 includes a comparator 202, conversion/retransmission control unit 204, AND gate 206, inverter 208, and retransmit frame generating unit 210. The conversion/retransmission unit 200 will be described with reference to FIG. 5.

The comparator 202 receives as inputs the ID code (hereinafter referred to as a transmission ID) of a transmitted message (transmit frame SMSG1) and the retransmission ID (IDA in this case) set in the retransmission ID register 142, and compares the two inputted IDs. As shown in FIG. 5, when the transmission ID is IDA, the comparator 202 sets an output S1 to Active (H).

The output S1 from the comparator 202 is inputted in the conversion/retransmission control unit 204 and AND gate 206.

The conversion/retransmission control unit 204 receives as inputs the transmit error detection signal from the error management unit 134, the output S1 from the comparator 202, an output S5 from a comparator 222 of the conversion/reception unit 220, and an output S6 from a comparator 224 of the conversion/reception unit 220. Based on the inputs, the conversion/retransmission control unit 204 makes a retransmission request to the bit stream control unit 132 and activates (H) or deactivates (L) an output S2 to the AND gate 206.

The transmit error detection signal becomes H if an error occurs during transmission of a transmit frame SMSG1 by the node 120 (including a case in which an error notification is received from another node in relation to the transmit frame SMSG1). As shown in FIG. 5, when the transmit error detection signal becomes H, the conversion/retransmission control unit 204 sets the retransmission request to H and sets the output S2 to the AND gate 206 to L regardless of whether the output S1 of the comparator 202, output S5 of the comparator 222, and output S6 of the comparator 224 are H or L. Consequently, an output S3 of the AND gate 206 becomes L and an output S4 of the inverter 208 becomes H.

The output S3 of the AND gate 206 and output S4 of the inverter 208 are inputted in the retransmit frame generating unit 210. The retransmit frame generating unit 210 selects either the ID code (transmission ID) or retransmission-specific ID (IDB) of the transmit frame SMSG1 and generates a retransmit frame SMSG2 by combining the selected ID code with the DLC/DATA part of the transmit frame SMSG1. In selecting the ID, the retransmit frame generating unit 210 selects the retransmission-specific ID (IDB) when S3 and S4 are H and L, respectively, but selects the transmission ID when S3 and S4 are L and H, respectively.

As shown in FIG. 5, when the transmit error detection signal is H, since the output S2 of the conversion/retransmission control unit 204 is L, the retransmit frame generating unit 210 selects the transmission ID. Consequently, the retransmit frame SMSG2 generated by the retransmit frame generating unit 210 is the same as the transmit frame SMSG1.

Also, since the conversion/retransmission control unit 204 makes a retransmission request to the bit stream control unit 132 by setting the retransmission request to H, the transmit frame SMSG1 is retransmitted.

Now, description will be given of cases in which transmit error detection signal is L, meaning that there is no transmit error.

When the transmission ID is IDA, the output S1 of the comparator 202 is H. In this case, the conversion/retransmission control unit 204 determines whether to retransmit the message, based on the output S5 of the comparator 222 and output S6 of the comparator 224.

Although details of the comparators 222 and 224 and their outputs S5 and S6 will be described later, H on the output S5 indicates that after transmission of the transmit frame SMSG1, the other node has transmitted a message which has a retransmission-specific ID of IDB and an H on the output S6 indicates that after transmission of the transmit frame SMSG1, the other node has transmitted a message which has a retransmission ID of IDA. As shown in FIG. 5, when either the output S5 of the comparator 222 or output S6 of the comparator 224 is H, the conversion/reception unit 220 does not make a retransmission request. Consequently, the transmit frame SMSG1 is not retransmitted.

On the other hand, when the output S5 of the comparator 222 and output S6 of the comparator 224 are both L, i.e., if no message with either a retransmission-specific ID or retransmission ID is transmitted from the other node after transmission of the transmit frame SMSG1, the conversion/reception unit 220 sets the retransmission request to H and sets S2 to H. Thus, the output S3 of the AND gate 206 becomes H and the output S4 of the inverter 208 becomes L. Consequently, the retransmit frame SMSG2 generated by the retransmit frame generating unit 210 is "IDB (i.e., retransmission-specific ID)+DLC/DATA of transmit frame SMSG1." That is, the transmit frame SMSG1 is retransmitted after its ID code is converted from IDA which is a retransmission ID into IDB which is a retransmission-specific ID.

Incidentally, when the ID code of the transmit frame SMSG1 is other than the retransmission ID of IDA, the conversion/retransmission control unit 204 does not make a retransmission request.

FIG. 6 is a flowchart showing a flow of processes performed by the conversion/retransmission unit 200. When the transmit frame SMSG1 is transmitted from the node 120 (S10), the conversion/retransmission unit 200 checks whether the ID code of the transmit frame SMSG1 is a retransmission ID of IDA (S20).

When the ID code of the transmit frame SMSG1 is IDA (S20: Yes), the conversion/retransmission unit 200 checks whether a message with IDA or a message with a retransmission-specific ID (IDB) corresponding to IDA is transmitted from another node (S22). If no message with either IDA or IDB has been transmitted from another node (S22: No), the conversion/retransmission unit 200 retransmits the transmit frame SMSG1 by replacing its ID code with IDB (S24). On the other hand, if a message with either IDA or IDB has been transmitted from another node (S22: Yes), the conversion/retransmission unit 200 does not convert its ID code for retransmission of the transmit frame SMSG1.

Incidentally, when the ID code of the transmit frame SMSG1 is other than IDA (S20: No), the conversion/retransmission unit 200 does not convert its ID code for retransmission of the transmit frame SMSG1.

If a transmit error occurs (S30: Yes), the conversion/retransmission unit 200 retransmits the message without converting its ID code (S32). In this case, what is retransmitted is the transmit message which has caused a transmit error. For example, if the transmit error involves the transmit frame SMSG1 transmitted in Step S10, the transmit frame SMSG1 is transmitted. If the transmit error involves the retransmit message transmitted in Step S24 (the transmit frame SMSG1 with its identifier converted into IDB), the retransmit message is transmitted again.

The conversion/reception unit 220 includes the comparator 222, comparator 224, a DLC/DATA temporary buffer (hereinafter simply referred to as the temporary buffer) 226, a comparator 228, a conversion/reception control unit 230, an inverter 232, and a receive frame generating unit 234. The conversion/reception unit 220 will be described with reference to FIG. 7.

The conversion/reception control unit 230 receives reception EOF from the bit stream control unit 132, an error state notification signal from the error management unit 134, a signal S5 from the comparator 222, and a signal S7 from the comparator 228. Upon receiving the reception EOF, the conversion/reception control unit 230 sets the outputs S8 and S9 to H or L based on the error state of the local node as indicated by the error state notification signal, the state (H or L) of the signal S5, and the state (H or L) of the signal S7.

As shown in FIG. 7, when the error state notification signal from the error management unit 134 indicates Error Active state, the conversion/reception control unit 230 sets the outputs S8 and S9 to H regardless of whether the signal S5 of the comparator 222 and output S7 of the comparator 228 are H or L. Consequently, an output S10 of the inverter 232 becomes L.

The output S9 of the conversion/reception control unit 230 is a control signal which indicates whether to make the receive frame generating unit 234 generate a receive frame. Hereinafter this signal will be referred to as a receive frame generation request. When the receive frame generation request S9 is H, the receive frame generating unit 234 selects either the ID code (reception ID) or retransmission ID (IDA) of a receive frame RMSG1 and generates a receive frame RMSG2 by combining the selected ID code with DLC/DATA of the receive frame RMSG1. The receive frame RMSG2 is outputted from the receive frame generating unit 234 to the message handler 150, and further transmitted to the receive buffer 154 via the message handler 150 and stored in the message handler 150. When the receive frame generation request S9 is L, the receive frame generating unit 234 does not generate a frame. In this case, the receive frame RMSG1 is discarded.

When selecting an ID, the receive frame generating unit 234 selects the retransmission ID (IDA) if the output S8 of the conversion/reception control unit 230 and the outputs S10 of the inverter 232 are H and L, respectively, and selects the reception ID if S8 and S10 are L and H, respectively.

As shown in FIG. 7, in Error Active state, since the output S8 from the conversion/reception control unit 230 is always L and the receive frame generation request S9 is always H, each time a message is received, the receive frame generating unit 234 generates a receive frame RMSG2 identical to the receive frame RMSG1 and outputs the receive frame RMSG2 to the message handler 150.

In Error Passive state, the outputs S8 and S9 of the conversion/reception control unit 230 vary with the output S5 of the comparator 222 and output S7 of the comparator 228.

The comparator 222 receives as inputs the ID code (hereinafter referred to as a reception ID) of the received message (receive frame RMSG1) and the retransmission-specific ID (IDB in this case) set in the retransmission-specific ID register 144, and compares the two inputted IDs. As shown in FIG. 7, when the reception ID is IDB, the comparator 222 sets the output S5 to H.

The output S5 of the comparator 222 is inputted into the conversion/retransmission control unit 204 of the conversion/retransmission unit 200 and into the conversion/reception control unit 230.

The comparator 224 receives as inputs the reception ID and the retransmission ID (IDA in this case) set in the retransmission ID register 142, and compares the two inputted IDs. As shown in FIG. 7, when the reception ID is IDA, the comparator 224 sets the output S6 to H.

When the output S6 of the comparator 224 becomes H, the temporary buffer 226 temporarily stores the DLC/DATA part of the receive frame RMSG1. That is, out of receive frames, the temporary buffer 226 stores the frames whose ID code is a retransmission ID.

The comparator 228 compares DLC/DATA of the receive frame received this time with DLC/DATA of the last received frame among the frames stored in the temporary buffer 226. If DLC/DATA of the two frames match as a result of the comparison, the comparator 228 sets the output S7 to H. Otherwise, the comparator 228 does not set the output S7 to H.

When the output S5 of the comparator 222 and output S7 of the comparator 228 are both H, the conversion/reception control unit 230 sets the receive frame generation request S9 to L. An H on both the output S5 of the comparator 222 and output S7 of the comparator 228 means that the ID code of the receive frame RMSG1 is a retransmission-specific ID and that the original message has already been received successfully. Consequently, the receive frame RMSG1 is discarded.

When the output S5 of the comparator 222 is H and the output S7 of the comparator 228 is L, the conversion/reception control unit 230 sets both the output S8 and receive frame generation request S9 to H. An H on the output S5 of the comparator 222 and an L on the output S7 of the comparator 228 mean that the ID code of the receive frame RMSG1 is a retransmission-specific ID and that the original message has not been received successfully. Consequently, the receive frame generating unit 234 generates a receive frame RMSG2 by converting the ID code of the receive frame RMSG1 from IDB to IDA.

When the reception ID is a retransmission ID (IDA), the output S5 of the comparator 222 becomes L and the output S6 of the comparator 224 becomes H. In this case, regardless of the output S7 of the comparator 228, the conversion/reception control unit 230 sets the output S8 to L, and the receive frame generation request S9 to H. Consequently, the receive frame generating unit 234 generates a receive frame RMSG2 identical to the receive frame RMSG1 and outputs the receive frame RMSG2 to the message handler 150.

Finally, when the reception ID is neither IDA nor IDB, the output S5 of the comparator 222 and output S6 of the comparator 224 are both set to L. In this case again, the conversion/reception control unit 230 sets the output S8 to L, and the receive frame generation request S9 to H. Consequently, the receive frame generating unit 234 generates a receive frame RMSG2 identical to the receive frame RMSG1 and outputs the receive frame RMSG2 to the message handler 150.

That is, in Error Passive state, when the ID code of the receive frame RMSG1 is a retransmission-specific ID, the conversion/reception unit 220 checks whether the original message has already been received successfully. If the original message has already been received, the conversion/reception unit 220 discards the receive frame RMSG1. Otherwise, the conversion/reception unit 220 converts the ID code of the receive frame RMSG1 from the retransmission-specific ID (IDB) to a retransmission ID (IDA) and outputs the resulting receive frame to the message handler 150.

Figure 8:
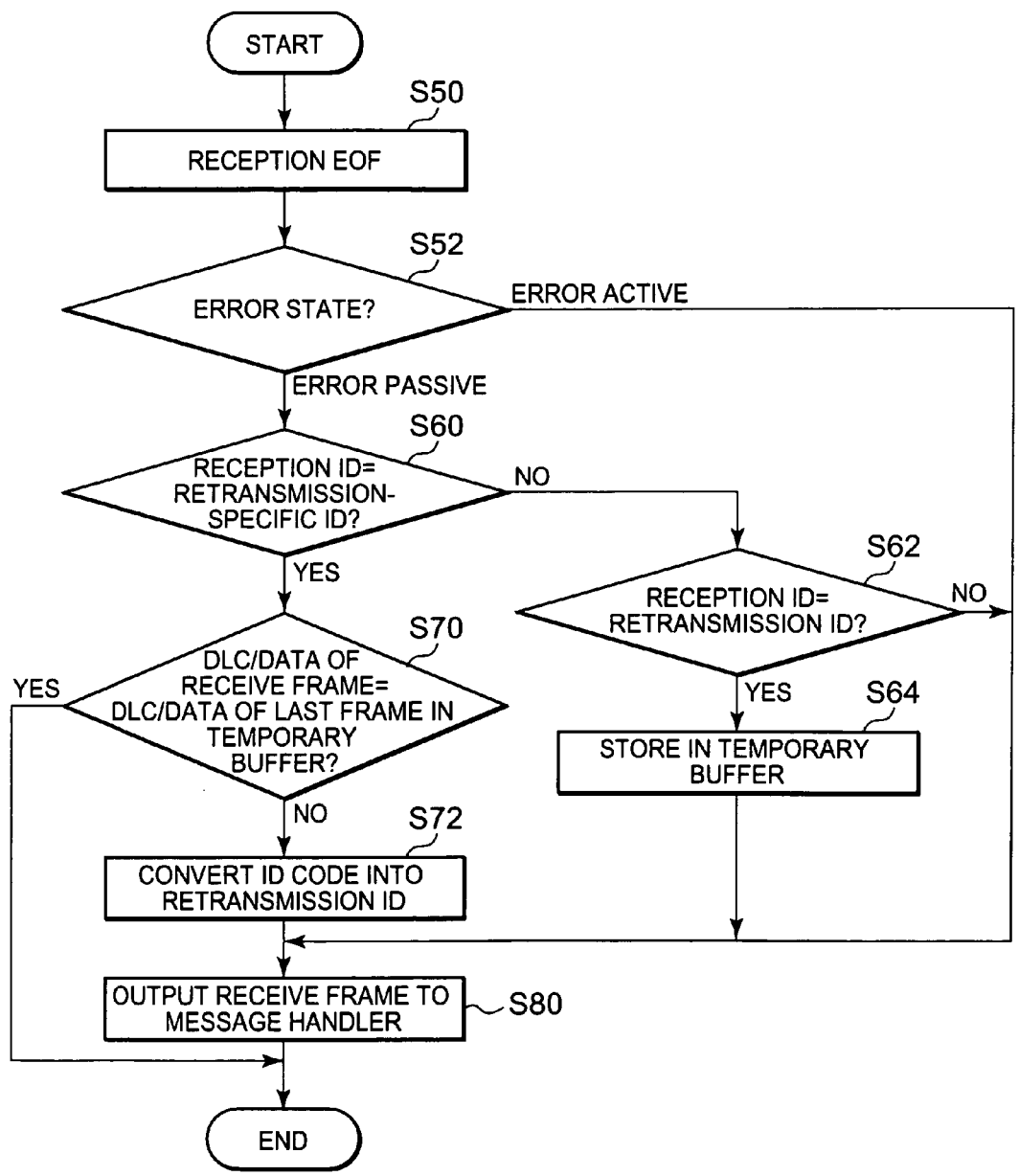
FIG. 8 is a flowchart showing a flow of processes performed by the conversion/reception unit 220 of the message retransmission management unit shown in FIG. 4.
Figure 9:
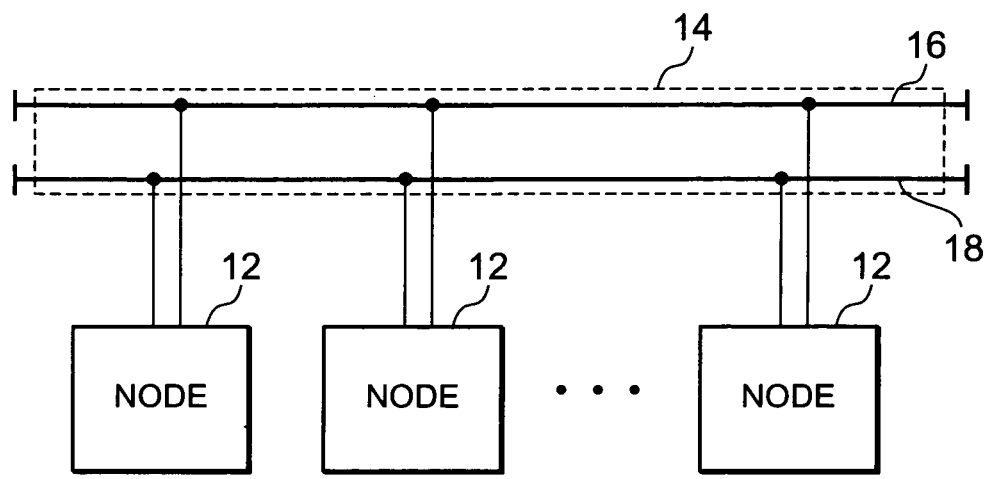
FIG. 9 is a diagram showing an example of connections in a CAN system.
Figure 10:
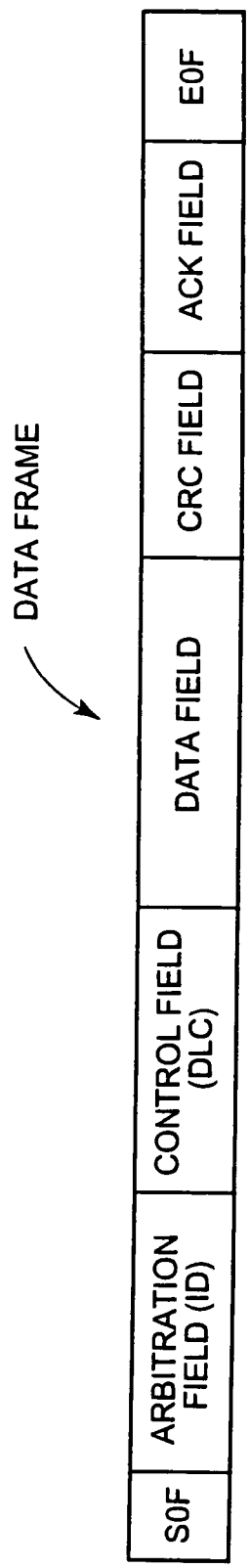
FIG. 10 is a diagram showing standard format of the data frame defined by the CAN protocol.
Figure 12:
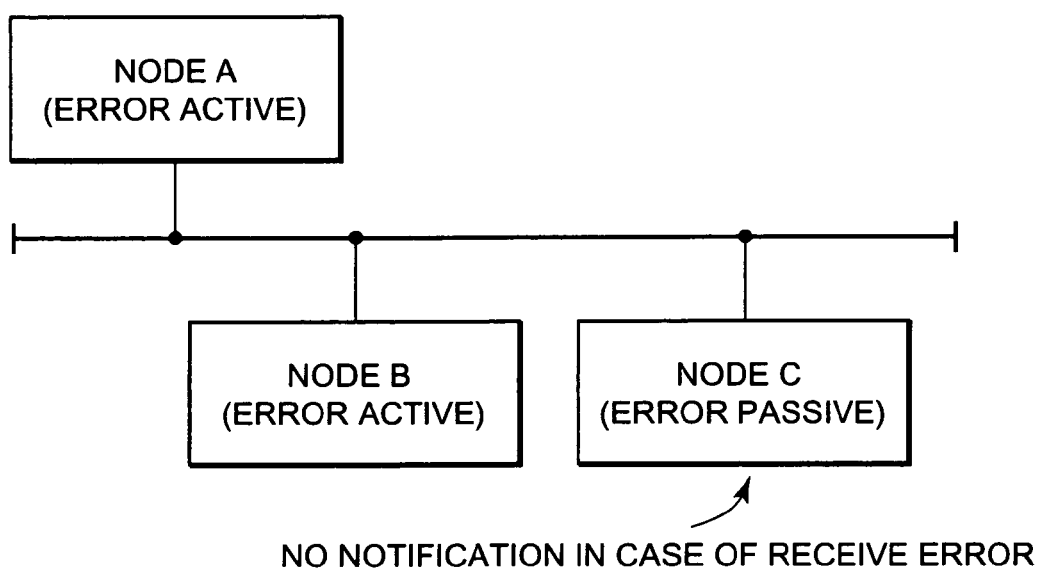
FIG. 12 is a diagram illustrating the risk of a message being undelivered in the CAN system.

FIG. 8 is a flowchart showing a flow of processes performed by the conversion/reception unit 220. When the node 120 receives a message (receive frame RMSG1) (S50), the conversion/reception unit 220 checks the error state of the local node (S52).

In Error Active state, the conversion/reception unit 220 outputs the receive frame RMSG1 as it is to the message handler 150 (S52: Error Active; S80).

In Error Passive state, the conversion/reception unit 220 checks whether the ID code of the receive frame RMSG1 is a retransmission ID or retransmission-specific ID and whether there is a match between DLC/DATA of the receive frame RMSG1 and DLC/DATA of the last frame stored in the temporary buffer 226 (S60, S62, S70).

When the ID code of the receive frame RMSG1 is a retransmission ID (S60: No; S62: Yes), the conversion/reception unit 220 stores DLC/DATA of the receive frame RMSG1 in the temporary buffer 226 (S64) and outputs the receive frame RMSG1 to the message handler 150.

When the ID code of the receive frame RMSG1 is neither a retransmission-specific ID or retransmission ID (S60: No; S62: No), the conversion/reception unit 220 outputs the receive frame RMSG1 as it is to the message handler 150. In this case, the conversion/reception unit 220 does not store data in the temporary buffer 226.

When the ID code of the receive frame RMSG1 is a retransmission-specific ID and there is a match between DLC/DATA of the receive frame RMSG1 and DLC/DATA of the last frame stored in the temporary buffer 226 (S60: Yes; S70: Yes), the conversion/reception unit 220 discards the receive frame RMSG1.

When the ID code of the receive frame RMSG1 is a retransmission-specific ID and there is no match between DLC/DATA of the receive frame RMSG1 and DLC/DATA of the last frame stored in the temporary buffer 226 (S60: Yes; S70: No), the conversion/reception unit 220 generates a receive frame RMSG2 by converting the ID code of the receive frame RMSG1 from the retransmission-specific ID to a retransmission ID and outputs the receive frame RMSG2 to the message handler 150 (S72, S80).

In the CAN system 100 according to the first exemplary embodiment, when a node transmits a message, if the ID code of the message is a retransmission ID, the node retransmits the message by converting the ID code of the message into a retransmission-specific ID. Also, when receiving a message, if the ID code of the message is a retransmission-specific ID and if the original message has not been received successfully, the node converts the ID code of the received message into a retransmission ID before carrying out normal reception procedures such as storing the received message in a receive buffer. This ensures that messages marked for retransmission will always be retransmitted, making it possible to reduce undelivered messages even if a message transmitted to a node in Error Passive state is not received successfully. This makes it possible to reduce queries to the receiving nodes by software in an upper layer, receipt notifications, and other processes and thereby avoid excessive traffic increases.

Also, the use of the retransmission-specific ID lower in priority than the corresponding retransmission ID makes it possible to reduce impacts on transmission of other nodes.

Also, when the local node is in Error Active state, since the local node gives an error notification (recognized as a transmit error by the sender node) if a message has not been received successfully, the risk of the message being undelivered is low. Thus, according to the first exemplary embodiment, each node carries out normal reception procedures when it is in Error Active state, and carries out procedures intended for a receive message carrying a retransmission-specific ID (discards the receive frame if the original message has already been received, but carries out normal reception procedures by converting the ID into a retransmission ID if the original message has not been received successfully) only when the node is in Error Passive state. This simplifies reception control in Error Active state.

Conventionally, for example, if a node 120 (A) transmits a message carrying a retransmission ID (IDA) to a node 120 (B) and another node 120 (C) also transmits a message with IDA to the node 120 (B) before the node 120 (A) retransmits the message by converting the ID code of the message into IDB, when the node 120 (A) retransmits the message, DLC/DATA of the last frame stored in the temporary buffer 226 of the node 120 (B) belongs to the message from the node 120 (C). Consequently, DLC/DATA of the message (with an ID code of IDB) retransmitted from the node 120 (A) and DLC/DATA of the message (with an ID code of IDA) transmitted from the node 120 (C) are compared, resulting in a misjudgment that the message with IDA, i.e., the message transmitted from the node 120 (A) has not been received successfully.

In contrast, according to the first exemplary embodiment, after a node transmits a message with a retransmission ID, the node is set to cancel retransmission from itself if a message with a retransmission ID or a message with a retransmission-specific ID corresponding to the retransmission ID is transmitted from another node. This makes it possible to prevent the misjudgment.

Furthermore, in the first exemplary embodiment described above, the retransmission IDs are set in the retransmission ID register 142. However, all the ID codes with a priority equal to or higher than a predetermined priority may be designated as retransmission IDs. This ensures that important messages will always be retransmitted.

Although the invention has been described above in connection with the exemplary embodiment thereof, it will be appreciated by those skilled in the art that the exemplary embodiment is provided solely for illustrating the invention, and should not be relied upon to construe the appended claims in a limiting sense.

Further, it is noted that, notwithstanding any claim amendments made hereafter, applicant's intent is to encompass equivalents all claim elements, even if amended later during prosecution.

What is claimed is:

1. A Controller Area Network (CAN) node, coupled to a CAN bus to which a plurality of CAN nodes are coupled, the CAN node comprising:
   a register that stores setting information indicating a message is to be retransmitted; and
   a retransmission unit that transmits a message, and determines, based on the setting information of the register, whether to retransmit the transmit message or not,
   wherein the retransmission unit does not retransmit the transmit message which the setting information of the register indicates to be retransmitted, when the CAN node receives a message corresponding to the transmit message from another CAN node;
   wherein the message includes a first message including a first ID code and a first data, and
   wherein the retransmission unit, when the retransmission unit determines the first message is to be retransmitted based on the setting information of the register,
      changes the first ID code of the first message to a retransmission-specific ID code to transmit a second message including the retransmission specific ID code and the first data, after transmitting the first message, and
      does not transmit the second message after transmitting the first message, when the CAN node receives the first message or the second message from another CAN node;
   an error counter that counts a number of errors caused when the CAN node transmits and receives a message;
   an error management unit that changes an error state of the CAN node based on a count value of the error counter, the error state of the CAN node including an Error Active state, an Error Passive state, and a Bus Off state;
   a message buffer that holds a reception message; and
   a reception unit that controls storing of the reception message in the message buffer based on the count value of the error counter and the setting information of the register,
   wherein the reception unit, when the reception unit detects the CAN node in the Error Passive state receiving the second message based on the count value of the error counter and the setting information of the register, changes the retransmission-specific ID code of the received second message to the first ID code to store the first message including the first ID code and the first data in the message buffer.

2. The CAN node according to claim 1, wherein the reception unit stores a data of the reception message in a temporary buffer, when the reception unit detects, based on the count value of the error counter and the setting information of the register, the CAN node in the Error Passive state receiving a message which the setting information of the register indicates to be retransmitted.

3. The CAN node according to claim 2, wherein the reception unit, when the reception unit detects, based on the count value of the error counter and the setting information of the register, the CAN node in the Error Passive state receiving the second message,
   changes the retransmission-specific ID code of the received second message to the first ID code to store the first message including the first ID code and the first data in the message buffer, when the data of the received second message does not coincide with the data of the reception message in the temporary buffer, and
   discards the received second message, when the data of the received second message coincides with the data of the reception message in the temporary buffer.

4. The CAN node according to claim 1, wherein the resister stores a retransmission ID code which comprises the ID code of the message to be retransmitted, and
   wherein the retransmission unit changes the first ID code of the first message to the retransmission-specific ID code to transmit the second message after transmitting the first message, when the first ID code of the first message coincides with the retransmission ID code of the register.

5. The CAN node according to claim 4, wherein the retransmission-specific ID code indicates a lower priority than the retransmission ID.

6. A communication method of a communication system including a Controller Area Network (CAN) node, the communication method comprising:
   storing setting information indicating a message is to be retransmitted;
   transmitting a message; and
   determining, based on the setting information, whether to retransmit the message or not,
   not retransmitting the message which the setting information indicates to be retransmitted, if the CAN node receives a message corresponding to the message from another CAN node;
   the message includes a first message including a first ID code and a first data,
   if the message is determined to be retransmitted based on the setting information, then the communication method further comprises:
      changing the first ID code to a retransmission-specific ID code to transmit a second message including the retransmission-specific ID code and the first data, after transmitting the first message; and
      not transmitting the second message after transmitting the first message, if the CAN node receives the first message or the second message from another CAN node;
   counting a number of errors caused, if the CAN node transmits and receives a message;

changing an error state of the CAN node based on a count value of the number of errors, the error state of the CAN node including an Error Active state, an Error Passive state, and a Bus Off state;
holding a reception message in a buffer;
determining whether to store the reception message based on the count value of the number of errors and the setting information; and
changing the retransmission-specific ID code of the received message to the first ID code and storing the first message including the first ID code and the first data in the buffer, if the reception message comprises the second message and the error state of the CAN node comprises the Error Passive state.

7. The communication method according to claim 6, further comprising storing the reception message in a temporary buffer, if the reception message comprises a message for which the setting information indicates to be retransmitted and the CAN node is in the Error Passive state.

8. The communication method according to claim 7, wherein if the reception message comprises the second message and the error state of the CAN node comprises the Error Passive state, the communication method further comprises:
changing the retransmission-specific ID code of the received second message to the first ID code to store the first message including the first ID code and the first data in the buffer, if the data of the received second message does not coincide with the data of the reception message in the temporary buffer; and
discarding the received second message, if the data of the received second message coincides with the data of the reception message in the temporary buffer.

9. The communication method according to claim 6, further comprising:
storing a retransmission ID code which the ID code of the message to be retransmitted, and
changing the first ID code of the first message to the retransmission-specific ID code to transmit the second message after transmitting the first message, if the first ID code of the first message coincides with the retransmission ID code being stored.

10. The communication method according to claim 9, wherein the retransmission-specific ID code indicates a lower priority than the retransmission ID.

* * * * *